United States Patent [19]
Hattass et al.

[11] Patent Number: 5,609,388
[45] Date of Patent: Mar. 11, 1997

[54] WIND DEFLECTOR FOR A SLIDING ROOF FOR A VEHICLE

[75] Inventors: Rainer Hattass, Gründau; Brigitte Weidmann, Frankfurt, both of Germany

[73] Assignee: Rockwell International GmbH, Germany

[21] Appl. No.: 572,938

[22] Filed: Dec. 15, 1995

[30] Foreign Application Priority Data

Dec. 15, 1994 [DE] Germany .......................... 44 44 630.6

[51] Int. Cl.$^6$ .......................................................... B60J 7/22
[52] U.S. Cl. .............................................................. 296/217
[58] Field of Search ............................................... 296/217

[56] References Cited

U.S. PATENT DOCUMENTS 3,156,175  11/1964  Werner ................... 296/217

FOREIGN PATENT DOCUMENTS 250925   1/1988  European Pat. Off. .......... 296/217
7811769  6/1980  Netherlands .................... 296/217

Primary Examiner—Dennis H. Pedder

[57] ABSTRACT

The air guide surface of a wind deflector for automobile sliding roofs consists of an elastic profile strip, tapering downwards, i.e. continually decreasing in thickness, of a rubber-elastic material, which is fixed to a rigid bar, adapted to the transverse curvature of the roof plate and mounted upwardly sprung on the sliding roof frame. The elastic profile strip bears, in the working position, sealingly against the forward roof opening rim, with the result that an undisturbed and therefore largely noiseless air flow is achieved, even with the sliding lid only slightly open, and even with the wind deflector not completely raised. The inclined position and construction of the elastic profile strip make possible, when the wind deflector is moved into its stowed position, a rolling-up or rolling-in deformation of the elastic profile strip virtually inside the water gutter of the sliding roof frame, so that the stowed space requirement of the wind deflector, particularly as regards height, is very small.

15 Claims, 4 Drawing Sheets

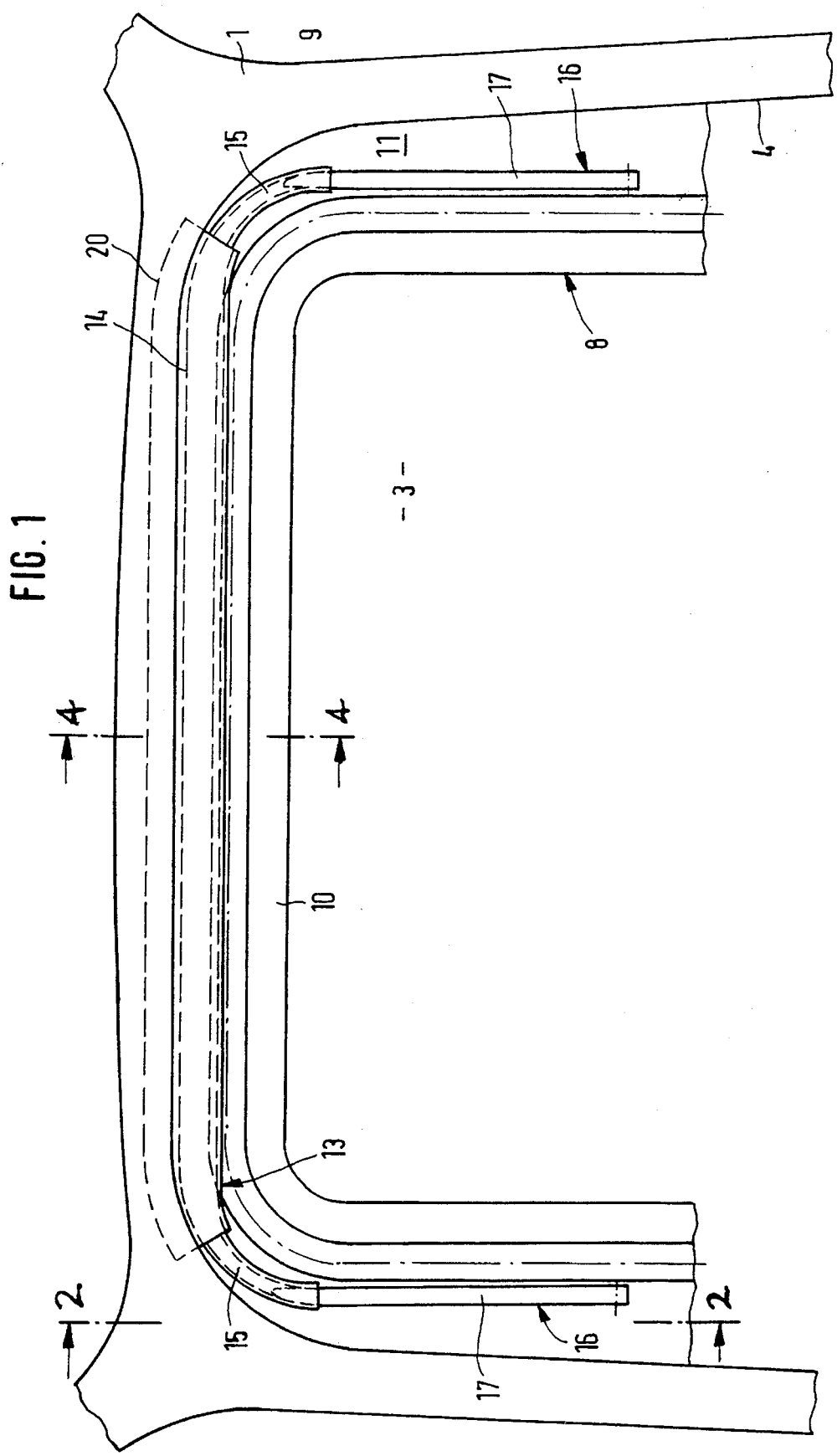

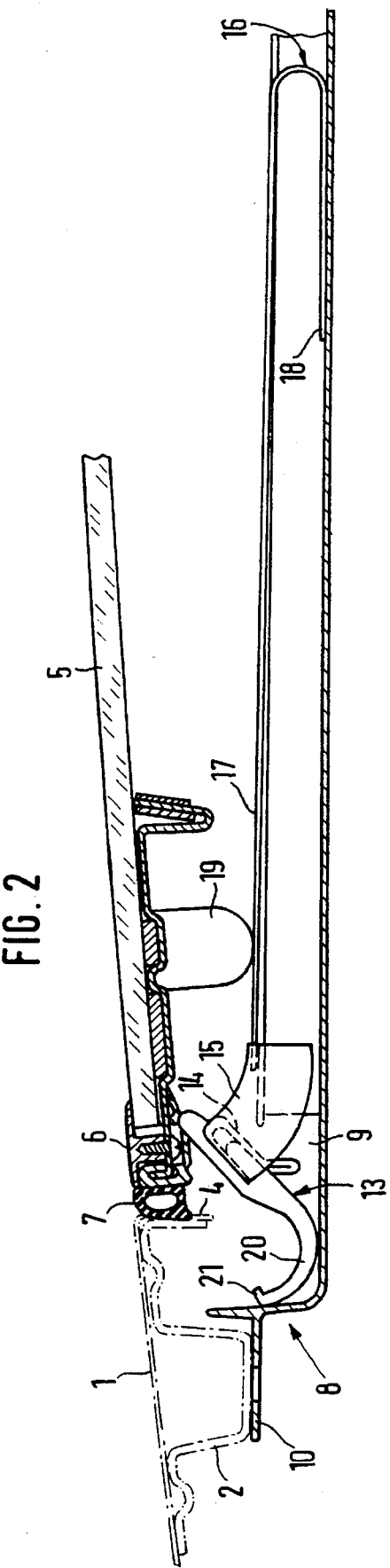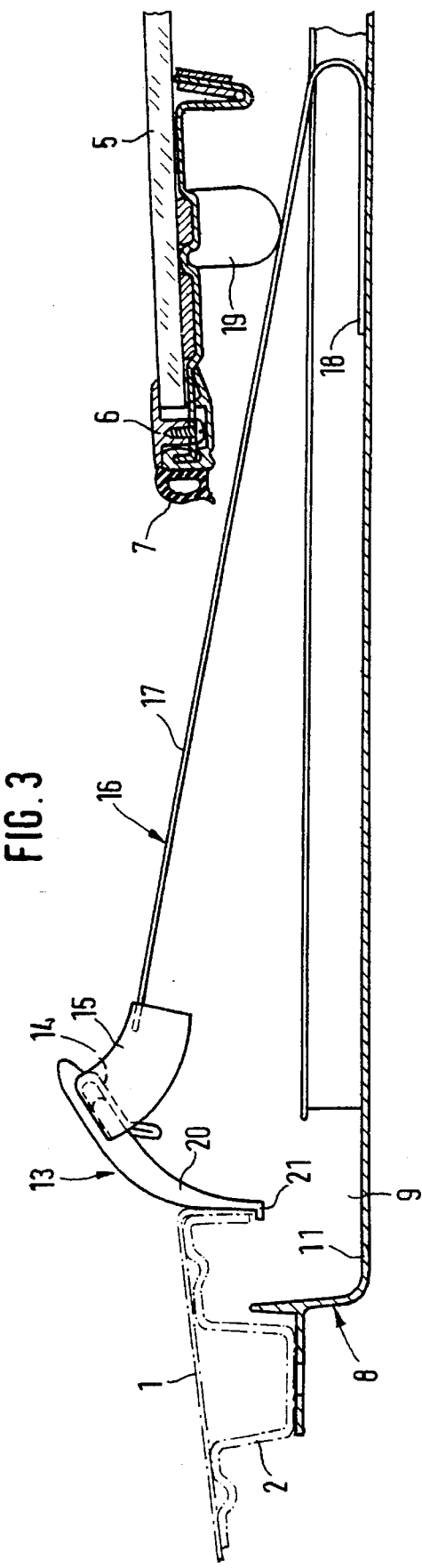

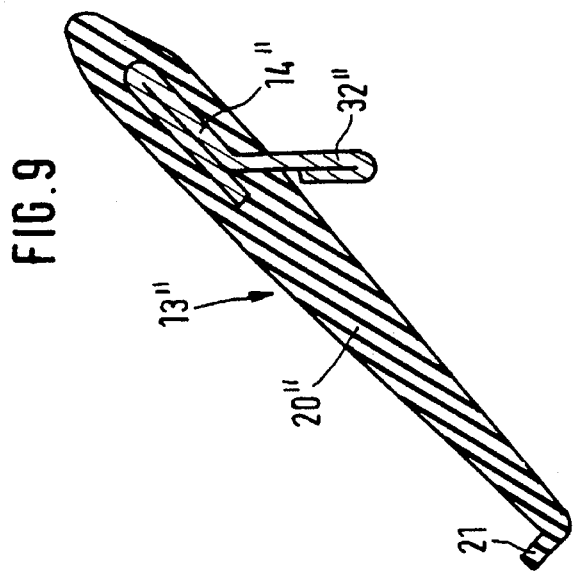
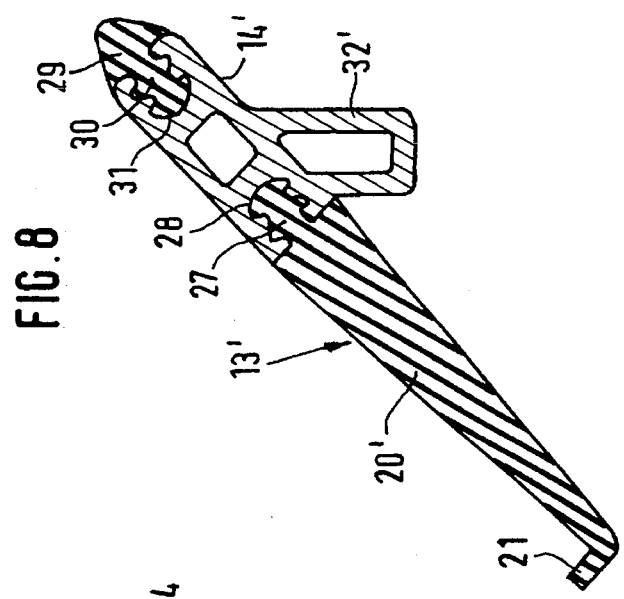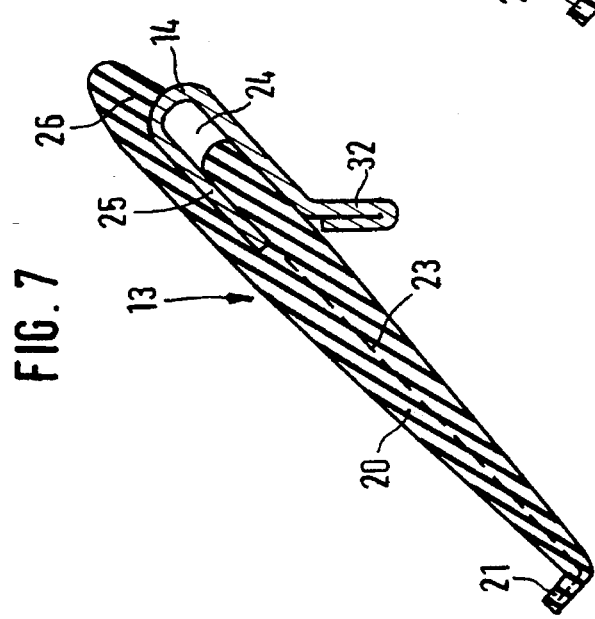

5,609,388

WIND DEFLECTOR FOR A SLIDING ROOF FOR A VEHICLE

TECHNICAL FIELD

This invention relates to a wind deflector for a sliding roof of a vehicle particularly an automobile and a sliding roof for such a vehicle.

BACKGROUND OF THE INVENTION

In one known deflector for a sliding roof of a vehicle (German Patent No. 11,89,393), the deflector air guide is housed, in the at-rest or stowed position, upright or on-edge in a forward edge gap between the sliding lid and a front transverse frame component of the sliding roof frame. The deflector has an elastic strip formed with an upwardly tapering profile, by which a bending deformation of the elastic strip dependent upon the vehicle and wind flow speed is intended to be achieved.

When the deflector's air guide is raised above the roof surface in its working and erect position, a forwardly orientated flange projection of a rigid bar constructed as U-section, which receives the lower end of the elastic strip for the purpose of fixing it, engages beneath the head of a sealing strip, fixed as an edge gap seal to a downwardly bent roof opening rim. In this way the upward movement of the air guide is limited and at the same time entry of air before and beneath the air guide is prevented. This known arrangement of an upstanding wind deflector has proved satisfactory in automobiles with a roof surface extending virtually horizontally in the direction of travel and relatively small roof openings of the sliding roof.

Modern automobile bodies increasingly have a wedge-shaped longitudinal contour, in which the roof surface, starting from the upper edge of the front pane, rises towards the upper edge of the rear window pane. If a body of this type is equipped with a sliding roof, the front transverse edge of the roof opening is situated at a lower level than the rear transverse edge of the roof opening. This difference in level increases further by the use of sliding roofs of increasingly large area, in the roof openings of which the distance between the front and rear edges of the roof opening is considerably larger. Therefore, when the sliding lid is pushed back, the raised wind deflector must be capable of guiding the air stream above the higher, rear roof opening edge. For this purpose, however, the upper edge of the air guide must project higher above the front roof opening rim, which requires that the cross-section of the air guide be lengthened.

Lately the overall height of the sliding roof units has, however, been continually decreased to give greater headroom for the occupants of an automobile, so that the distance between the bottom of the water gully of the front transverse frame profile and an edge gap sealing profile pushed onto the edge of the sliding lid, for example glass lid, is no longer sufficient for accommodating an air guide standing on edge. Added to this is the fact that the useful distance between the bottom of water gutter and edge gap sealing profile in a sliding-lifting roof is still further reduced by the penetration of the front edge of the lid into the front roof opening region when the rear edge of the lid is raised.

SUMMARY OF THE INVENTION

A primary object of the invention is to construct the air guide of the wind deflector of the sliding roof so that particularly for rearwardly ascending vehicle roofs of large opening area, the air guide will still project sufficiently far above the front edge of the roof opening when in its working position but on the other hand can be housed in its at-rest position in a seating chamber of low height. This is achieved by forming the air guide as an elastic strip which has a downwardly tapering profile, the strip being fixed in the vicinity of its thickened upper end to a rigid bar. The outer that is forwardly facing surface of the strip is smooth. The lower edge of the strip is formed so that as the roof closes and the lower edge meets a front transverse component of the frame of the roof, the lower edge bends over resiliently.

In the wind deflector according to this invention, considerable elastic deformability is imparted to the elastic strip in its lower region by its downwardly tapering profile and its fixing to the rigid bar in the vicinity of its thickened upper end. In this way, and by the forwardly flexible construction of its lower end, when the elastic strip meets the front transverse frame component of the roof when the sliding lid is closed, it is elastically deformed to reduce the space occupied by it and is so to speak partly rolled up.

The air guide can, therefore, be used even with sliding roof constructions of a shallow depth yet have a sufficiently large effective extended length when the sliding roof is opened for the air flow, even with modern automobile bodies, to be guided reliably over the rear edge of the roof opening.

The lower end of the elastic strip is advantageously constructed with a hook-like formation at the lower edge of the elastic strip to form a travel-limiting abutment and sealing up which, in the raised position of the deflector presses resiliently against an abutment surface at the forward edge of the roof opening. The provision of an additional abutment surface to the forward edge of the roof opening may be unnecessary if the roof plate of the automobile is downwardly cranked and laps over the roof opening to form a front roof opening rim.

To assist the elastic bending and rolling-up of the elastic strip as the sliding roof closes and the strip meets the forward frame transverse member, which may be the generally horizontal floor of the water gutter of the frame transverse member, the lower edge of the strip may be rounded where it adjoins the inner surface of the strip. The rounded edge facilitates sliding and the resultant forwardly orientated bending of the elastic strip onto and against the forward transverse member of the sliding roof frame.

The elastic strip can be economically produced by cutting to length a continuous profile which has been extrusion moulded. The rigid bar to which the upper end of the strip is fixed can, with advantage, be formed from bent sheet metal, glass fibre or extruded aluminium.

For specific applications, for example with fairly large profile widths of the air guide, it may be advantageous to reinforce the elastic strip with an elastically flexible inlay, made for example from thin perforated spring steel. In this way the hook-shaped, bent lower end of the elastic strip can also be correspondingly reinforced, thus improving the bearing and sealing action.

The elastic strip does not need to occupy the entire profile width of the air guide in an embodiment in which a part of the smooth outer surface of the air guide is occupied by a corresponding outer surface of the rigid bar which is flush with the outer surface of the strip. Alternatively, the air guide of the deflector can be formed with elastic material on both sides of the rigid bar by forming the deflector with an additional elastic profile strip fixed to the rigid bar opposite the main elastic strip.

An advantageous possible way of forming the air guide consists in that the air guide is formed by injection moulding around the rigid bar and possibly also the elastically flexible inlay, with the rubber-elastic material of the elastic strip.

Since the air guide needs to be constructed smooth only at its outer face facing forwards in the direction of travel, in order to avoid turbulence of the air stream in running, the rigid bar can project from the inner surface of the air guide surface so as to increase its bending stiffness.

BRIEF DESCRIPTION OF THE DRAWINGS

The invention is now described below in more detail in various forms of construction with reference to the attached drawings. In the drawings:

FIG. 1 is a partial plan view on the forward region of a vehicle roof equipped with a sliding roof, showing the deflector in its at-rest and stowed position, but with the sliding lid removed to simplify the drawings according to a first embodiment of the invention;

FIG. 2 is a sectional view on line 2—2 in FIG. 1, but with the sliding lid shown closed;

FIG. 3 is a sectional view similar to FIG. 2, with the sliding lid pushed back and the deflector in its erect and working position;

FIG. 7 is a section through a first form of embodiment of the deflector air guide illustrated as extended, but not yet installed;

FIG. 8 is a section similar to FIG. 7 through a second form of embodiment of the deflector air guide, and FIG. 9 is a section similar to FIG. 7 through a third form of embodiment of the deflector air guide.

DETAILED DESCRIPTION OF THE PREFERRED EMBODIMENTS

Figure 4:
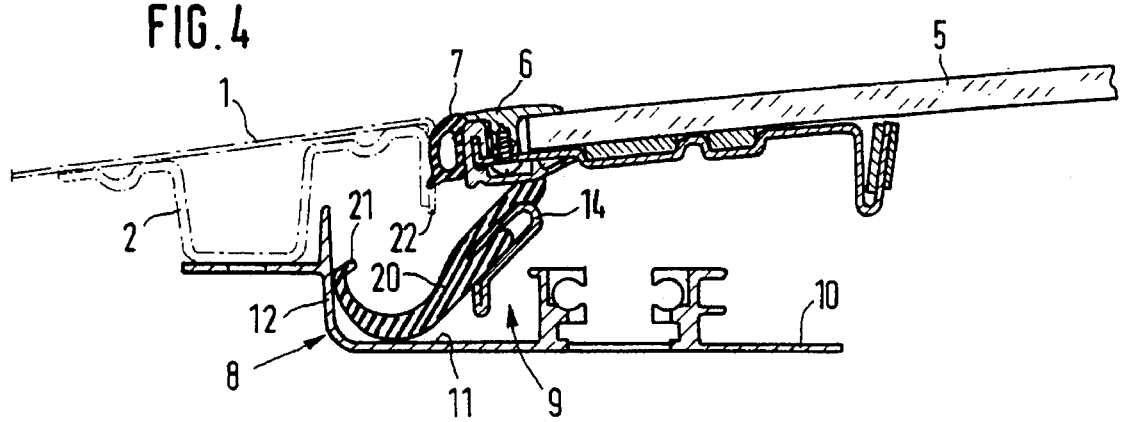
FIG. 4 is a section on line 4—4 in FIG. 1, but with the sliding lid shown closed.

In FIG. 1, the roof plate 1 of an automobile body, which is equipped with a sliding roof, is shown. The term sliding roof is to be understood as including also sliding-lifting roofs. In the sectional views, the roof plate 1 and a reinforcing frame 2 fixed thereto are illustrated in dot-and-dash lines. In the roof plate there is a roof opening 3, which is surrounded by a roof opening rim 4, formed by a downwardly directed, bent flange of the roof plate 1.

Associated with the roof opening 3 is a sliding lid 5 which, in the closed position of the sliding roof (FIGS. 2 and 4) closes the roof opening 3 flush with the roof plate 1 and, in the example shown, is constructed as a glass lid. The sliding lid 5 has a border frame 6, to which an edge gap sealing profile 7 is fixed, which, when the sliding lid is closed, sealingly fills the edge gap present between the roof opening rim 4 and the sliding lid 5.

Beneath the roof opening 3 is a sliding roof frame 8, fixed to a reinforcing frame 2, on which (sliding roof frame) the sliding lid 5 is guided slidably and pivotally in the vicinity of its forward edge. On the sliding roof frame, the drive elements that actuate the sliding lid are also fitted. Since the guiding and drive elements for the sliding lid do not form the subject of the present invention and furthermore form part of the state of the art, a description of them will be dispensed with at this point. The sliding roof frame 8 comprises, beneath the edge gap between the roof opening rim 4 and the sliding lid 5, a water gutter 9, which collects and-conducts away any water that penetrates through the edge gap. The water gutter 9 possesses, at least in the region of the front frame transverse portion 10, a planewater gutter base 11, which is disposed generally horizontally both in the direction of travel and also transversely. Towards the outside, the water gutter 9 is bounded by a generally vertical wall 12.

As can be seen from FIGS. 1 to 3 in the region of the forward frame transverse portion 10, air guide 13, described in greater detail below, is provided, which extends transversely to the direction of travel and comprises a rigid bar 14, adapted to the transverse curvature of the roof plate 1, which extends at a distance from the forward roof opening rim 4, along the forward contour of the roof opening 3. The two ends of the rigid bar 14 are curved backwards or are fixed to the corresponding curved pieces. The bends or curved pieces are referenced 15 in FIGS. 1 to 3. The bends or curved pieces 15 are each rigidly secured to an elongate stirrup spring 16. The stirrup springs 16 each have a longer arm 17 and a shorter arm 18. While the longer arm is connected in the described manner to the air guide 13, the shorter arm is secured to the water gutter base 11 so that the stirrup springs, together with air guide 13, have a generally U-shaped form as shown in FIG. 1. The stirrup springs 16 are fitted with prestress in the closed position of the roof, with the result that, when the sliding lid 5 is pulled back, the longer arms 17 spring upwards and lift out the air guide 13 of the wind deflector into the working position shown in FIG. 3. When the sliding lid 5 is being displaced into its closed position, shown in FIG. 2, slide blocks 19 fixed to the sliding lid on both sides in the vicinity of the front edge of the sliding lid 5 slide on the upwardly sprung, longer arms 17 of the stirrup springs 16, thus causing the air guide 13 to be displaced downwards towards its at-rest position shown in FIG. 2, until it is housed at the forward frame transverse member 10 beneath the roof plate 1.

Instead of stirrup springs, a rigid lever can be rigidly fixed on each side to the bend or curved piece 15, which lever is pivotally connected at its other end to the sliding roof frame 8 and is prestressed upwardly by a spring.

For a more detailed explanation of the air guide 13, reference is now made to FIGS. 4 to 9. As can be seen from these, the air guide consists basically of an elastic strip 20 and the already mentioned rigid bar 14, to which the elastic strip is fixed in a manner still to be explained. The elastic strip possesses a downwardly tapering profile and is fixed, in the vicinity of its thickened upper end, to the rigid bar 14. The elastic strip 20 can be formed by cutting to length from a profile which has been extrusion moulded from a suitable rubber-elastic material. The rigid bar 14 may be formed as a bent sheet metal component (FIGS. 7 and 9), as a glass fibre-reinforced plastics component or as an extruded aluminium component (FIG. 8).

Figure 5:
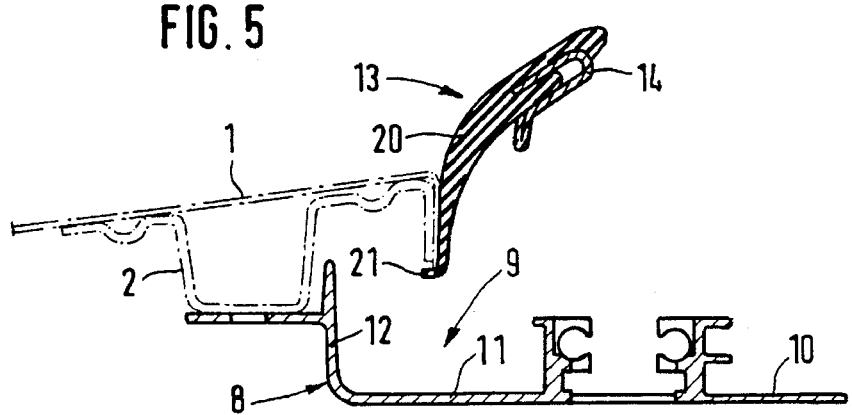
FIG. 5 is a section similar to FIG. 4 with the sliding lid opened, and the deflector in its erect and working position.

At its lower end, the elastic strip 20 is bent hook-shaped approximately perpendicularly forwards to form a bearing and sealing lip 21. When the air guide 13 is raised, the bearing and sealing lip comes into contact, in travel-limiting manner, with an abutment surface 22 which in the example shown is the lower edge face of the roof plate 1, cranked downwards to form the forward roof opening rim. In the working position of the air guide 13, the bearing and sealing lip 21 bears sealingly against the abutment surface 22 under the action of the spring force of the stirrup springs 16, as FIG. 5 shows. Furthermore, the external surface of the elastic strip 20, because of the elastic spring force of the elastic strip, is pressed sealingly against the adjacent roof opening rim 4. When the vehicle is in motion, therefore, no air can penetrate between the roof opening rim 4 and the air guide 13.

Because of its particular construction and its elastic material properties, the elastic strip 20 is capable of a specific deformation behaviour during the closure operation, i.e. as it is displaced from its working position into the at-rest position. This is, of course, true in reverse for its displacement from the at-rest position into the working position.

Figure 6:
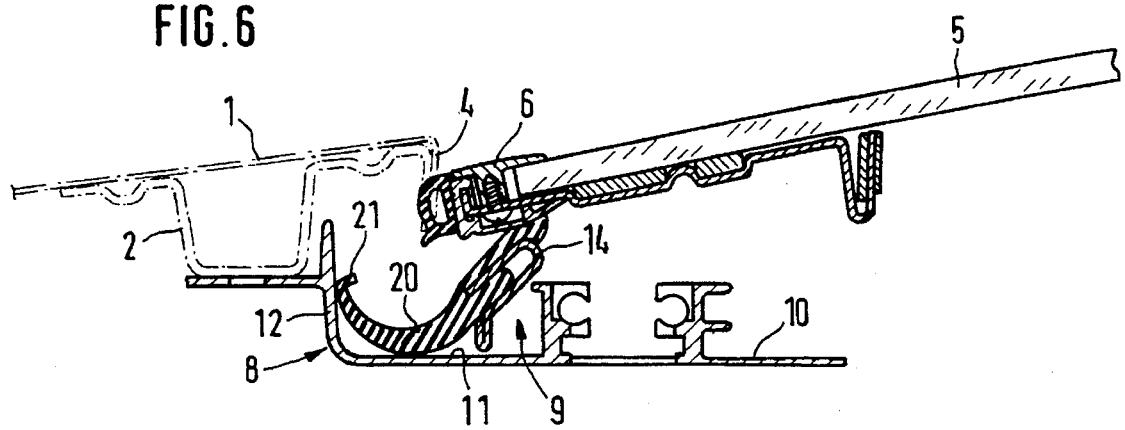
FIG. 6 is a section similar to FIG. 4 with, starting from its closed position, the sliding lid og a the sliding-lifting roof tilted upwardly.

If the slide-open sliding lid 5 is moved into its closed position (FIG. 2), the slide blocks 19 come onto the stirrup springs 16 and displace the air guide 13 downwards starting from the position according to FIGS. 3 and 5. The outer surface of the elastic strip 20, which is forwards during travel, slides downwards with elastic pressure against the surface of the roof opening rim 4. The bearing and sealing lip 21 now lifts off the abutment surface 22. Beneath the abutment surface 22, as movement continues, the elastic strip 20 starts to stretch because of its elastic restoring force and to displace with its lower end forwards, until the lower end of the elastic strip meets the water gutter bottom 11. With continuing movement, the elastic strip is now guided forwards by the water gutter base 11, on which it slides. This sliding and guiding operation is still further improved by the fact that, at the lower end of the elastic strip 20, the outer surface of the bearing and sealing lip 21 adjoins in rounded form the inner surface of the elastic strip. With further continuing movement, the lip 21 reaches the forward end of the water gutter base and is now guided along the rounded zone between the water gutter base 11 and the wall 12, until the lip 21 reaches the wall 12, against which it rises upwards. The elastic strip 20 now finally adopts its rolled-in or rolled-up position typical of the at-rest position, as shown in FIGS. 2 and 4. In this manner, even an air guide surface that is comparatively broad in profile can be accommodated in a space of low overall height when in the at-rest position. The air-guide 13, starting from its at-rest position according to FIG. 4, is still capable of being further deformed in the sense of being compressed as shown in FIG. 6. This additional deformability is essential for sliding-lifting roofs.

The elastic restoration capability of the elastic strip 20 into the extended position shown in FIG. 7 can be still further improved if the elastic strip is reinforced by an elastically flexible inlay 23, as indicated by the broken line in FIG. 7. The inlay may be constructed of thin spring steel in the form of a perforated plate, so that the material portions of the elastic strip situated on both sides of the inlay 23 are connected to one another through the openings of the perforated plate. This construction, desired for the stability of the elastic strip 20, is readily achieved in the extrusion forming of the elastic strip with a simultaneously fed-in and therefore embedded inlay 23. As is also apparent from FIG. 7, the inlay 23 can be provided, at the lower end, with a hook-like bend corresponding to the bearing and sealing lip 21, which penetrates into the lip. In this way, the hook-like structure of the lower end of the elastic strip 20 is stabilized, which is advantageous for the abutment and sealing function of the lip 21.

For the fixing of the elastic strip 20 to the rigid bar, various possibilities are available. In the first form of embodiment shown in FIGS. 1 to 7, the elastic strip 20 is provided, at its thickened upper end, with an undercut seating pockets 24. This is open, towards the inner face of the elastic strip 20, with a push-in opening for the rigid bar 14. The rigid bar 14 is formed U-shaped in the fixing region for engagement into the seating pocket 24 and engages partly form-fittingly into the undercut seating pocket 24, where in particular the inner arm 25 ensures the form-fitting clamping and fixing. The upper end 26 of the elastic strip 20 partly engages over the rigid bar 14 from above and holds it securely in its pushed-in position.

In the second form of embodiment according to FIG. 8, the elastic strip 20' is provided, at its thickened upper end, with a continuous fixing rib 27, which engages into a seating groove 28 of the rigid bar 14' for fixing the elastic strip and is held-form fittingly there by mutually engaging ribs and depressions. Whereas, in the first example of the embodiment according to FIG. 7, the rigid bar 14 is a bent sheet metal component, the rigid bar 14' in the case of the second form of embodiment according to FIG. 8 is an extruded aluminium profile comprising hollow chambers. The rigid bar 14 is so shaped that the elastic strip 20' adjoins, with its front outer surface, flush against the rigid bar 14'. The rigid bar therefore forms a part of the smooth outer surface of the air guide 13'. The upper termination of the air guide 13' is formed by an additional elastic profile strip 29, which is fixed to the rigid bar 14', opposite the elastic strip 20'. The fixing of the profile strip 29 takes place in a similar manner to the fixing of the elastic strip 20'. For this purpose, the profile strip 29 possesses a fixing rib 30, which engages, clamped by ribs and depressions, into a seating groove 31 of the rigid bar 14'. The fixing of the elastic strip 20' to the rigid bar 14' by engagement of the fixing rib 27 with the seating groove 28 is of such a type that even during bending of the elastic strip 20' during the movement phases of the wind deflector, the elastic strip 20' is firmly held to the rigid bar 14'.

In the third form of embodiment illustrated in FIG. 9, the rigid bar 14" is once again a bent sheet metal component, which in this case is firmly embedded in the air guide 13" by having the rubber-elastic material of the elastic strip 20" injection moulded around it.

In all three forms of embodiment according to FIGS. 7 to 9, the rigid bar 14, 14' or 14" respectively projects out of the inner face of the air guide 13, 13', 13" respectively, to increase its bending stiffness, with a profiled flange 32, 32', 32" respectively.

The air guide can be particularly simply and rationally produced, because the elastic strip, in the forms of embodiment according to FIGS. 7 and 8, can be cut off by sections from an extruded profile. In the embodiment according to FIG. 8, this is true also for the rigid bar 14' and the upper profile strip 29.

The air guide for a wind deflector for vehicle sliding roofs according to the preferred embodiment of this invention consists of an elastic profile strip of a rubber-elastic material, continuously tapering downwards, i.e. decreasing in thickness, which is fixed to a rigid bar, adapted to the transverse curvature of the roof plate and mounted so as to spring upwardly from the sliding roof frame. The elastic profile strip bears, in the working position, sealingly against the forward rim of the roof opening, which leads to an undisturbed and therefore largely noiseless air flow, even when the sliding lid is only slightly opened and the wind deflector is not fully raised. The inclined position and construction of the elastic profile strip make possible, as the wind deflector moves into its stowed position, for the elastic profile strip to rollingly deform virtually inside the water-gutter of the sliding roof frame, so that the stowed space requirement of the wind deflector, especially as regards height, is very small.

Although the invention has been shown and described with respect to preferred embodiments thereof, those skilled in the art should understand that various changes and omissions of form and detail thereof may be made without departing from the spirit and scope of the invention.

We claim:

1. A wind deflector for a sliding roof of a vehicle, said vehicle roof having a transverse curvature, said vehicle roof including a sliding roof plate which seats within a roof opening when closed, said roof opening having a front rim, said vehicle roof further including a roof frame underneath said roof plate, said roof frame including a forward transverse member, said wind deflector comprising;

an air guide having an air guidance portion, said air guide extending transversely to the direction of travel of the vehicle, said air guide comprising a strip of elastic material having a tapered profile, said air guide having a top edge and a bottom edge, said tapered profile being thicker at said top edge and narrower at said bottom edge, said air guide fixed to a rigid bar, wherein said bar is mounted upwardly sprung on a sliding roof frame for the purpose of automatically raising the air guide with its air guidance portion above the roof into a working position against said front roof opening rim when the sliding roof plate is opened, and when the sliding roof plate is closed, said air guide is lowered against the spring action of said upwardly sprung mount into a stowed position, wherein the air guide surface and the rigid bar are housed, when said sliding roof plate is closed, in said forward frame transverse member, wherein the elastic strip is fixed to the rigid bar near said upper edge of the elastic strip, wherein the lower edge of the elastic strip, when the sliding roof plate is closed, comes into contact against the front transverse member, wherein said elastic member is constructed to be bent upwardly forwards.

2. A wind deflector according to claim 1, wherein said lower edge of the elastic strip is bent hook-like and approximately perpendicularly forwards to form a bearing and sealing lip which, when the air guide is raised, comes into contact, in travel-limiting manner, with an abutment surface on the forward opening rim and is pressed sealingly against said forward opening rim by the spring force acting upon the air guide.

3. A wind deflector according to claim 2, wherein said roof plate has a lower edge face and wherein said abutment surface is on lower edge face of the roof plate.

4. A wind deflector according to claim 2, wherein said lower edge of the elastic strip has an outer surface and an inner surface, and wherein the outer surface of the bearing and sealing lip adjoins in rounded form to the inner surface of the elastic strip.

5. A wind deflector according to claim 1, wherein said elastic strip is formed from extrusion moulded rubber-elastic material.

6. A wind deflector according to claim 1, wherein the rigid bar is constructed as one of a bent sheet metal component, a glass fibre-reinforced plastics component or an extruded aluminum component.

7. A wind deflector according to claim 1 wherein the elastic strip is reinforced by an elastically flexible inlay.

8. A wind deflector according to claim 7 wherein the inlay is formed from thin, perforated spring steel and wherein said inlay has a lower end and wherein said lower end extends with a corresponding hook shaped bend into the bearing and sealing lip.

9. A wind deflector according to claim 1 wherein the elastic strip includes an undercut seating pocket located near said top edge, said undercut seating pocket adapted to receive the rigid bar, wherein said rigid bar engages at least partially form-fittingly into the undercut seating pocket for the purpose of fixing the elastic strip to the rigid bar.

10. A wind deflector according to claim 1 wherein the elastic strip includes a continuous fixing rib, wherein said fixing rib engages into a seating groove of the rigid bar and is held form-fittingly therein for the purpose of fixing the elastic strip to the rigid bar.

11. A wind deflector according to claim 1 wherein the elastic strip has a front outer surface, wherein said front outer surface adjoins flush to the rigid bar, wherein said front outer surface and said rigid bar form a part of the smooth outer surface of the air guide.

12. A wind deflector according to claim 11 wherein the upper edge of the air guide is formed of an additional elastic profile strip, said additional strip being fixed to the rigid bar opposite the elastic strip.

13. A wind deflector according to claim 7 wherein the air guide is formed by injection molding around the rigid bar with a rubber-elastic material comprising the elastic strip.

14. A wind deflector according to claim 1 wherein the rigid bar forms a profiled flange along the air guide.

15. A wind deflector according to claim 7 wherein said air guide is formed by injection molding rubber-elastic around said elastically flexible inlay.

* * * * *